United States Patent
Jayasuriya et al.

(10) Patent No.: US 7,347,465 B2
(45) Date of Patent: Mar. 25, 2008

(54) RETRACTABLE AUTOMOTIVE FRONT END WITH WEDGE LOCKING MEMBERS

(75) Inventors: Mangala Jayasuriya, Bloomfield Hills, MI (US); Philip Koneda, Novi, MI (US); Allan Gale, Livonia, MI (US); Wayne Woodside, Ypsilanti, MI (US); Nripen Saha, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/508,110

(22) Filed: Aug. 22, 2006

(65) Prior Publication Data

US 2008/0048461 A1    Feb. 28, 2008

(51) Int. Cl.
*B60R 19/40* (2006.01)
(52) U.S. Cl. ..................................... 293/118
(58) Field of Classification Search ................ 293/118, 293/119, 133
See application file for complete search history.

(56) References Cited

U.S. PATENT DOCUMENTS

| | | | |
|---|---|---|---|
| 5,967,573 A | 10/1999 | Wang | 293/119 |
| 6,019,419 A * | 2/2000 | Browne et al. | 296/187.1 |
| 6,302,458 B1 | 10/2001 | Wang | 293/132 |
| 6,401,565 B1 | 6/2002 | Wang | 74/502.4 |
| 6,709,035 B1 | 3/2004 | Namuduri | 293/118 |
| 6,773,044 B2 | 8/2004 | Schambre | 293/118 |
| 6,834,898 B2 | 12/2004 | Wang | 293/118 |
| 6,976,565 B2 | 12/2005 | Meernik | 188/372 |
| 6,976,718 B2 | 12/2005 | Nakanishi | 293/118 |

FOREIGN PATENT DOCUMENTS

FR        2608536    *  6/1988    ................ 293/119

* cited by examiner

*Primary Examiner*—Dennis H. Pedder
(74) *Attorney, Agent, or Firm*—Gigette Bejin; Miller Law Group, PLLC

(57) ABSTRACT

An extendible rail and bumper apparatus is mountable within the base frame lower rails of an automotive frame to provide an improved crash force absorbing bumper apparatus for deployment on either the front or rear bumpers of an automobile. The extendible rail member is mounted for telescopic movement through slidable guide members. A front plate is formed with wedge members positioned next to the extendible rail member. The actuation mechanism includes an electric motor that rotates a threaded rod having a conical member mounted thereon for translational movement thereon. The conical member engages a pair of outwardly projectable tabs that are driven outwardly into engagement with the wedge members when the extendible rail is fully extended. If required to absorb impact energy, the outwardly projected tabs push the wedge members into engagement with the front plate to transfer the energy into the base frame rail apparatus of the vehicle.

20 Claims, 6 Drawing Sheets

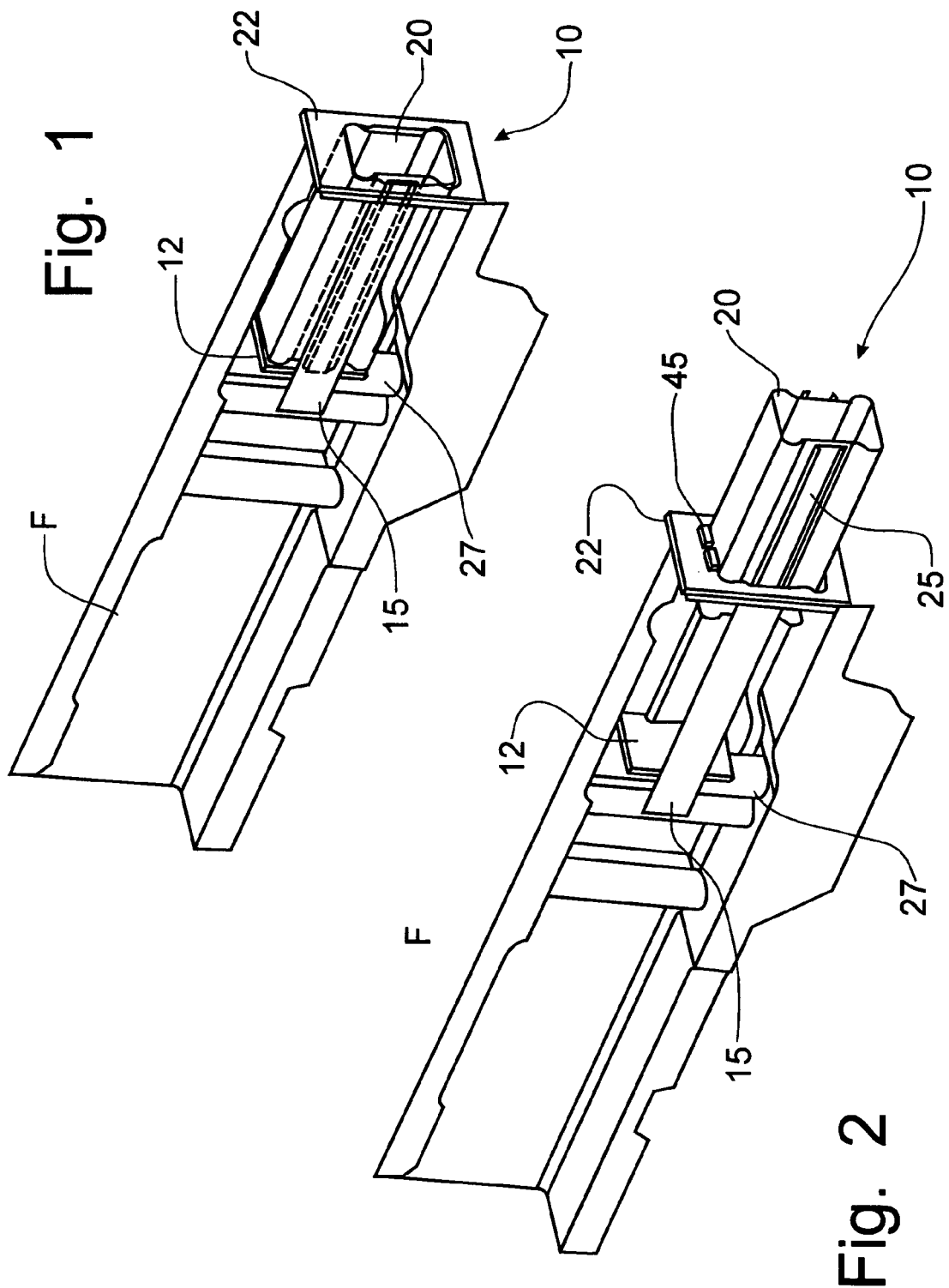

RETRACTABLE AUTOMOTIVE FRONT END WITH WEDGE LOCKING MEMBERS

FIELD OF THE INVENTION

This invention relates generally to a longitudinally extendible front end for an automotive vehicle and, more particularly, to a locking structure for the telescopically extendible rails to transfer impact forces to the frame of the vehicle.

BACKGROUND OF THE INVENTION

The front end structure of an automotive vehicle is designed to provide visual appeal to the vehicle owner while functioning as an energy absorbing structure during frontal and offset crashes. The size, shape and construction of the front end structure contribute to the ability of the front end structure to attenuate the crash pulse and restrict intrusions into the operator's cabin of the vehicle. It is important to design a front end structure to absorb crash energy through the most effective structural components, which is a front rail system. To that extent, a significant amount of effort by vehicle engineers is devoted to designing the front rails to crush in a controlled manner while absorbing a maximum amount of energy. If additional energy absorption is required, adding length to the front rails is the next logical engineering consideration. Even though longer front rails are desirable for efficient energy management, this option is usually commercially unacceptable to the vehicle customer because resulting structure is considered to be visually unattractive, increases the vehicle overall length and reduces vehicle parking maneuverability.

One of the goals in the design of vehicle frame structure is to provide better engagement and absorption of energy during a collision. The major components in absorbing energy in frontal as well as rear impacts are the rails. Furthermore, in a side collision if the vehicle has a softer front end it can help mitigate the injuries to occupants in both vehicles. If there is an apparatus to absorb more energy and prolong the time to crush the rails, the crash pulse and intrusion can be reduced significantly. With a longer front end structure on a vehicle, there is potential to achieve this goal. A secondary aspect to extending the front end structure is to localize less severe crash damage into a few local parts that are easily repairable or replaceable. A significant problem, however, is providing the extendible front end is to do so without changing other critical design aspects, such as styling and dimensions of a vehicle, that are critical to both the manufacturer and the customer.

Alternative engineering design can provide larger bumpers, deployable bumper airbags, and rails with pyrotechnique methods etc., which can have styling and packaging issues or require sensors to activate and can lead to high repair costs in the case of a false deployment of the known prior art systems. For these reasons, such alternative systems have not met with commercial acceptance. Accordingly, attempts have been made to provide a selectively extendible bumper structure that is operable to move the bumper from an aesthetically pleasing position to an extended position that positions the bumper at a significant distance from the retracted position. Such extendible bumper structures have been associated with a speed sensor such that the bumper extends automatically in response to the attainment of a preselected speed criteria.

One such extendible bumper structure can be found in U.S. Pat. No. 6,773,044, issued on Aug. 10, 2004, to John E. Schambre, et al, in which the front bumper is supported on telescopically extendible rails that move the front bumper forwardly when the vehicle reaches a predetermined speed. Drive cables and a worm gear assembly drive a ball screw cam into a locking mechanism inside the movable rail pieces. The locking links are driven outwardly by the ball screw cam to extend through slots aligned in the fixed and movable rail pieces so that crash forces can be transferred from the movable rail piece to the fixed rail piece during an impact.

The extendable rails disclosed in the Schambre patent are driven by a cable mechanism and a drive motor located inside the bumper. Accordingly, this bumper beam needs to be designed to have enough package space to house these components. Providing the space to house these components is an added design requirement for the bumper. The locking mechanism is one of the most critical components to manage energy during a frontal impact. The material that is removed in the fixed and movable rails to make slots for the locking links is significant. Locking links as disclosed in the Schambre patent need to be very strong and the resulting slot area becomes considerably large. As a result, the rail pieces become locally weaker at the slots and would have a tendency to bend during collision, especially when an offset impact is incurred.

Another extendible bumper structure is found in U.S. Pat. No. 6,709,035, issued to Chandra Namuduri on Mar. 23, 2004. The Namuduri extendable rail pieces are assembled inside a secondary casing which is mounted inside the base frame rail defining three sheet metal parts with closed cross sections at the front of the bumper when the rails are in a retracted position. The extendable rail travels inside the middle (secondary) rail casing which is rigidly attached to the outer frame rail. The actuating mechanism works with a lead screw that connects to a drive motor and a nut. The nut is connected to the inside end of the movable rail piece through a self-locking mechanism that works with a plurality of small spheres sliding on a tapered bushing. These spheres tightly constraint the extendable rail and the secondary casing during an impact.

The Namuduri bumper energy absorber for supporting the bumper structure relative to a vehicle includes an inner tube, an outer tube, a lead screw, a nut and a motor. Rotation of the lead screw by the rotor causes translation of the nut along the lead screw for driving at least a portion of the bumper structure between extended and retracted positions. When the extendable rail is moving outward and inward, respectively, a sensing and controller system is used to control the position of the two moving rail pieces. The degree of extension can be controlled by various parameters via sensors, including gear position, vehicle speed, obstacle range, approach rate and hard braking. With respect to crash energy management and efficiency of the system, having three tubes in the retracted position is not desirable and also add unnecessary weight and cost of manufacturing. The positioning of the motor mechanism installed inside the rails take up a considerable length and would not crush due to the many metal pieces in the motor, drive and the constraint mechanism. Furthermore, the movable rails need to be of a considerable size to adsorb a significant amount of energy during impact. Hence, the resulting complete mechanism becomes larger than a current front end and may not be suitable for vehicle design, especially for small vehicles.

U.S. Pat. No. 5,967,573, issued on Oct. 19, 1999, and related U.S. Pat. No. 6,302,458 issued on Oct. 16, 2001, and U.S. Pat. No. 6,401,565 issued on Jun. 11, 2002, all of which are issued to Jenne-Tai Wang, et al., disclose an extendible front bumper structure that actuates upon attainment of a pre-established speed criteria through a rack and pinion mechanism. The extendible rail structure is locked against the fixed rail structure by a plurality of small spheres that slide on a tapered bushing. These spheres deform the outer tube to absorb energy upon impact. U.S. Pat. No. 6,834,898, granted on Dec. 28, 2004, to Jenne-Tai Wang, et al, discloses similar structure having increased stiffness by mounting the actuator inside the tubular frame rail member. U.S. Pat. No. 6,976,565, granted to Paul Meernik et al, on Dec. 20, 2005, discloses a spring-loaded apparatus for absorbing energy in an extendible bumper apparatus as disclosed in the above-identified Wang patents.

Another configuration for an extendible bumper system can be found in U.S. Pat. No. 6,976,718, issued to Isumu Nakanishi on Dec. 20, 2005, in which an electric motor drives a threaded actuator rod to extend the front bumper from a retracted position to an extended position. The bumper apparatus incorporates an electromagnetic lock mechanism and a deformable, energy absorbing shaft to absorb impact forces encountered by the bumper apparatus.

It would be desirable to provide an extendible bumper for an automotive vehicle that incorporates a locking mechanism to transfer any crash forces encountered by the extended bumper to the frame of the vehicle. Such an extendible rail system would provide a rail extension apparatus and a control for extending the rails to improve crash energy management without affecting the visual appeal of the vehicle when stopped or at low speeds. The extendible rail system would be applicable to front or rear bumpers on an automotive vehicle.

SUMMARY OF THE INVENTION

It is an object of this invention to overcome the aforementioned disadvantages of the known prior art by providing an extendible bumper apparatus that incorporates wedge members that transfer crash forces to the frame of the vehicle.

It is another object of this invention to provide a tab mechanism that projects outwardly from the actuating mechanism for extending the telescopic rails supporting the extendible bumper to engage the wedge members transferring crash forces to the frame of the vehicle.

It is yet another object of this invention to provide a reliable and robust rail/bumper extension system that can work independently and does not depend on expensive sensing technology to be operable to deploy when a crash is encountered.

It is a feature of this invention to provide an extendable rail mechanism that provides an increase in crushable rail length.

It is an advantage of this invention that the extendible rail mechanism increases the energy absorption capability of the crushable rail structure of an automotive frame.

It is another advantage of this invention that the extendible rail structure retracts at low vehicle speeds for vehicle appearance and easy parking.

It is another feature of this invention to provide a semi-active deployment system for an extendible rail mechanism in which the extendible rail activates and extends based on minimal input signals.

It is still another advantage of this invention that the actuators added to provide an extendible rail mechanism do not adversely impact the crush capability of the vehicle frame rail system on which the extendible rail mechanism is mounted.

It is yet another advantage of this invention that the crash characteristic of the bumper is not adversely affected when the extendable rail mechanism is retracted and contained within the existing vehicle frame rail.

It is still another feature of this invention that the extendible rail is formed with a rectangular dog-bone shape so that the extensible rail will crush during an oblique crash in a manner similar to the base rail system.

It is still another advantage of this invention that the extendable rail can absorb energy in either the fully retracted or fully extended position.

It is yet another feature of this invention that the retracted extensible rail does not impose any significant restraints on the ability of the base frame rail apparatus to absorb crash energy.

It is a further advantage of this invention that the additional length of the extended rail apparatus will add energy absorption capability to the base rail apparatus of the vehicle.

It is a further feature of this invention that a positive interlock feature is enabled when the rail is fully extended to transfer crash energy into the base frame rail mechanism.

It is still a further feature of this invention that the interlock mechanism self-releases when disengaging to allow the extended rail to return to its at rest and retracted position.

It is yet a further feature of this invention that the extendible rail mechanism includes a guide and support system for minimizing sliding friction to minimize the effort needed to effect rail extension.

It is another feature of this invention that an electric motor provides the energy required for moving the extension rail with the bumper attached thereto, but is not part of the self-locking feature except for being operatively connected thereto for driving the tabs into engagement with the wedge members for self-locking the extensible rail mechanism.

It is yet a further advantage of this invention that the actuation motor can be used to provide both position and load feedback to confirm and continuously monitor the position of the extendible rail deployment, thereby providing a means of diagnostics to ensure the system is functional and ready to absorb energy when needed.

It is still another advantage of this invention that the interaction of the projectable tabs and the engaged wedge members provides a locking mechanism for the extendible bumper apparatus to transfer crash forces to the base frame of the vehicle.

It is still another feature of this invention that the tabs project through small slots formed in the extensible rail when the rail has been fully extended.

It is yet another feature of this invention that the actuator includes a conical member for driving the tabs outwardly into engagement with the wedge members when the extensible rail reaches the end of its extensible movement.

It is a further object of this invention to provide an extensible rail system incorporating a self-locking mechanism that is durable in construction, inexpensive of manufacture, carefree of maintenance, facile in assemblage, and simple and effective in use.

These and other objects, features and advantages are accomplished according to the instant invention by providing an extendible rail and bumper apparatus that is mountable within the existing base frame lower rails of an automotive frame to provide an improved crash force absorbing bumper apparatus for deployment on either the front or rear bumpers of an automobile. The extendible rail member is mounted for telescopic movement through slidable guide members. A front plate is formed with wedge members positioned next to the extendible rail member. The actuation mechanism includes an electric motor that rotates a threaded rod having a conical member mounted thereon for translational movement thereon. The conical member engages a pair of outwardly projectable tabs that are driven outwardly into engagement with the wedge members when the extendible rail is fully extended. If required to absorb impact energy, the outwardly projected tabs push the wedge members into engagement with the front plate to transfer the energy into the base frame rail apparatus of the vehicle.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a perspective view of an extendible rail mechanism according to the principles of the instant invention, mounted in the base lower frame rail of an automotive vehicle, the extendible rail member being shown in a retracted position;

FIG. 2 is a perspective view of an extendible rail mechanism similar to that of FIG. 1, but showing the extendible rail member in an extended position;

DETAILED DESCRIPTION OF THE PREFERRED EMBODIMENT

Figure 3:
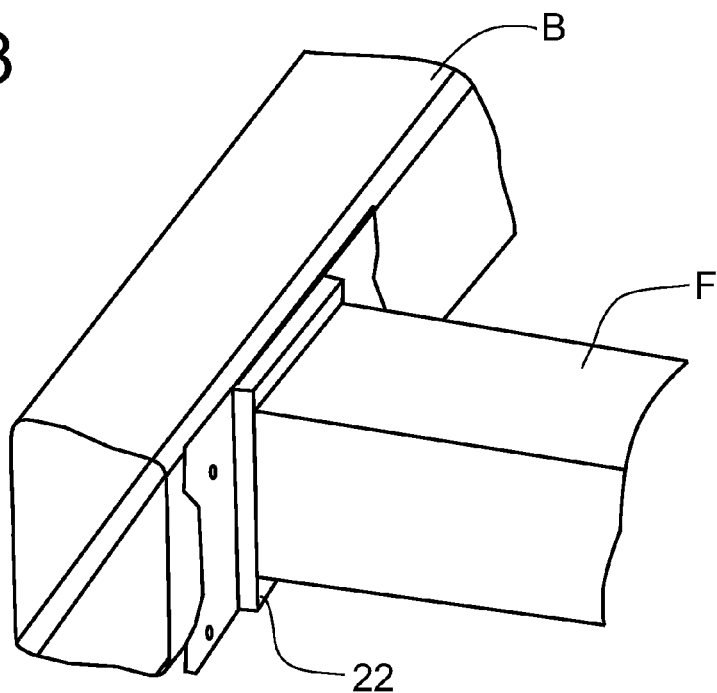
FIG. 3 is a partial perspective view of the bumper mounted on the extendible rail mechanism with the extendible rail being retracted into the fixed rail member.

Referring to FIGS. 1-8, an extendible rail and bumper apparatus incorporating the principle of the instant invention can best be seen. The extendible rail apparatus 10 is mounted in the base lower frame rails F of an automotive vehicle. The extendible rail apparatus 10 can be packaged within a typical existing front rail cavity without significant changes or obstructing packaging and attachment points to other front end components such as radiator, cross members etc. The extendible rail apparatus 10 is preferably constructed as a module that is firmly secured to the fixed front rail end by a back plate 12 and a front plate 22. Each laterally spaced lower front rail F of the automobile will be provided with a separate module 10 with the forwardly projecting ends of the movable rail member 20 being connected to the bumper system B so that the bumper B extends and retracts with the movable rail members 20.

The modular extendible rail apparatus 10 is supported within the lower frame rail F by a back plate 12 and a forwardly positioned front plate 22 on which are mounted a pair of laterally spaced slide support members 15. A movable rail member 20 is housed within the lower frame rail F and slidably supported on the slide support members 15 for movement in a fore-and-aft direction. The movable rail member 20 has a pair of glide members 25 that are attached to the respective lateral sides of the movable rail member 20 and slidably supported within the support members 15. In this configuration, the movable rail member 20 is linearly movable between a retracted position, as seen in FIG. 1 where the movable rail 20 lies between the back and front plates 12, 22, and an extended position, as shown in FIG. 2 where a substantial portion of the movable rail member 20 is located forwardly of the front plate 22.

Figure 4:
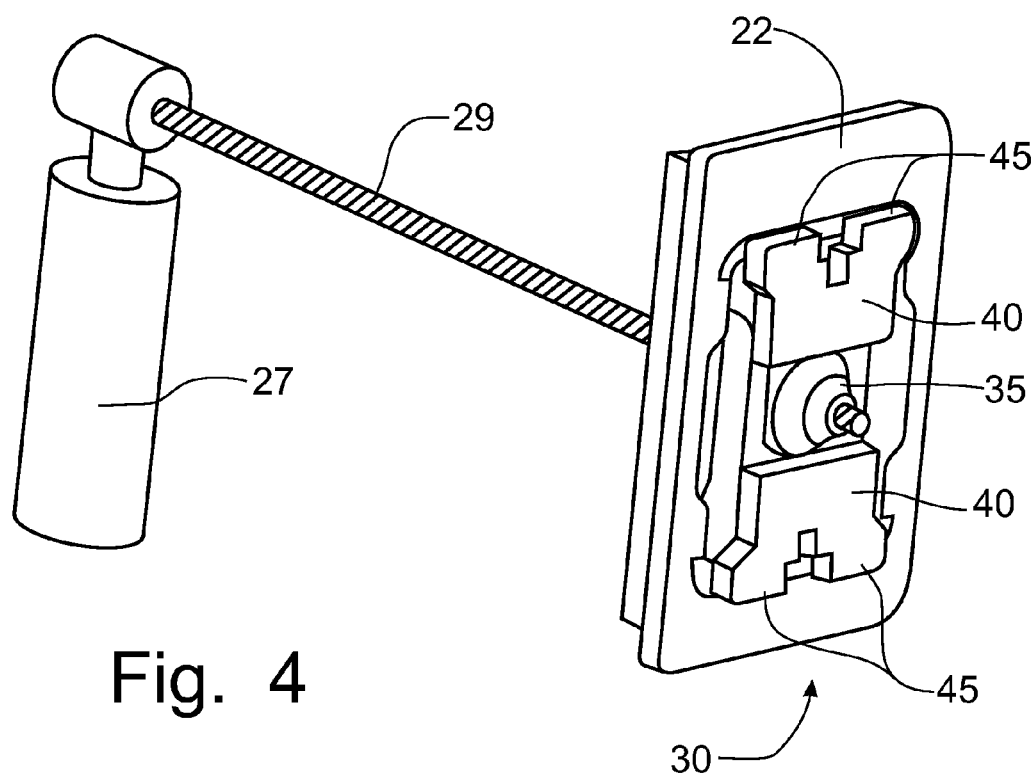
FIG. 4 is a perspective detail view of the actuation mechanism, including the electric motor, threaded rod, base plate for the extendible rail and the outwardly projectable tabs alignable with the wedge members when the extendible rail is fully extended, as is depicted herein.
Figure 5:
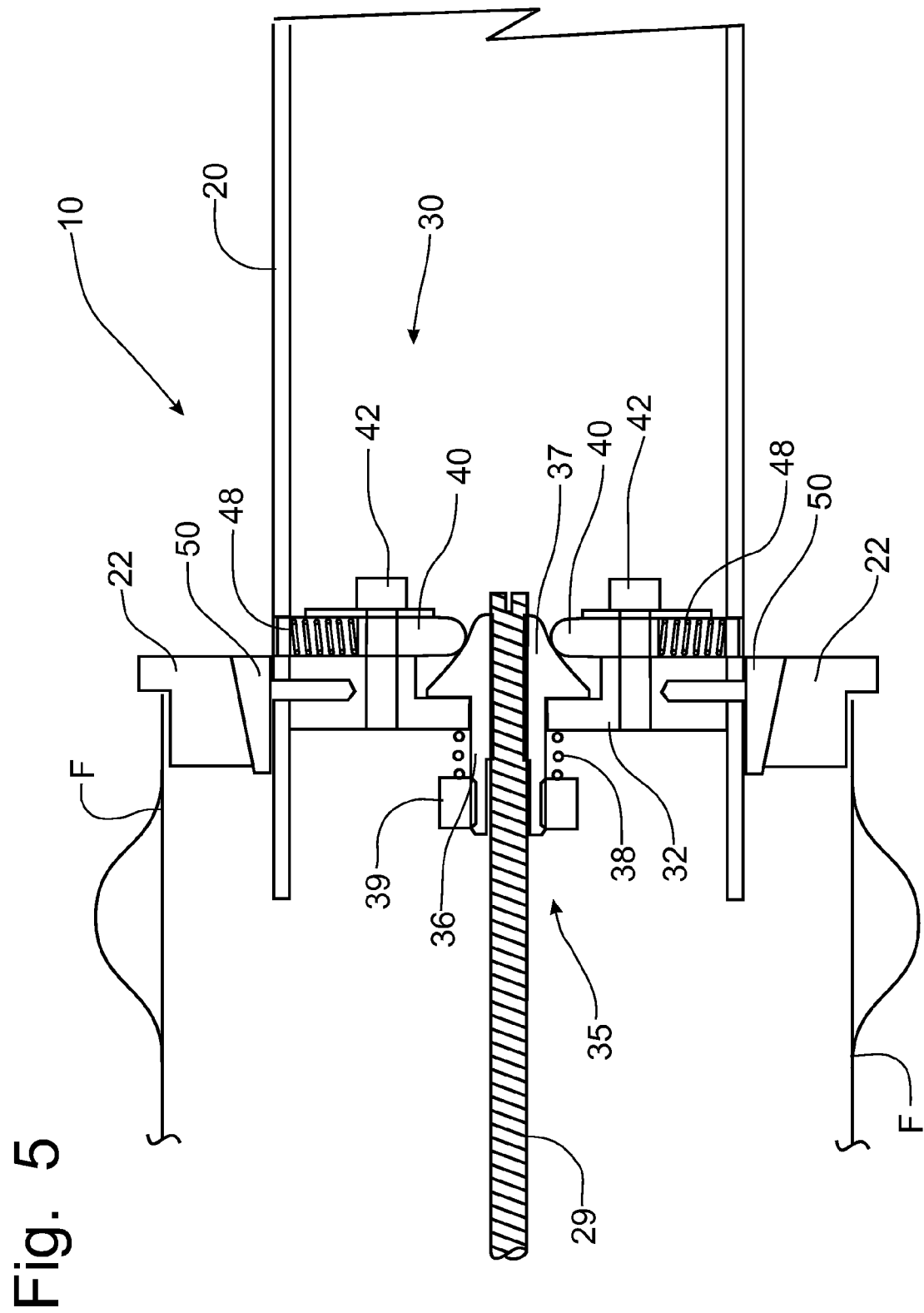
FIG. 5 is a partial cross-sectional view of the extendible rail mechanism showing the base plate of the extendible rail and the front plate taken at the point the extendible rail reaches full extension but immediately before the tabs are driven outwardly into alignment with the wedge members.
Figure 6:
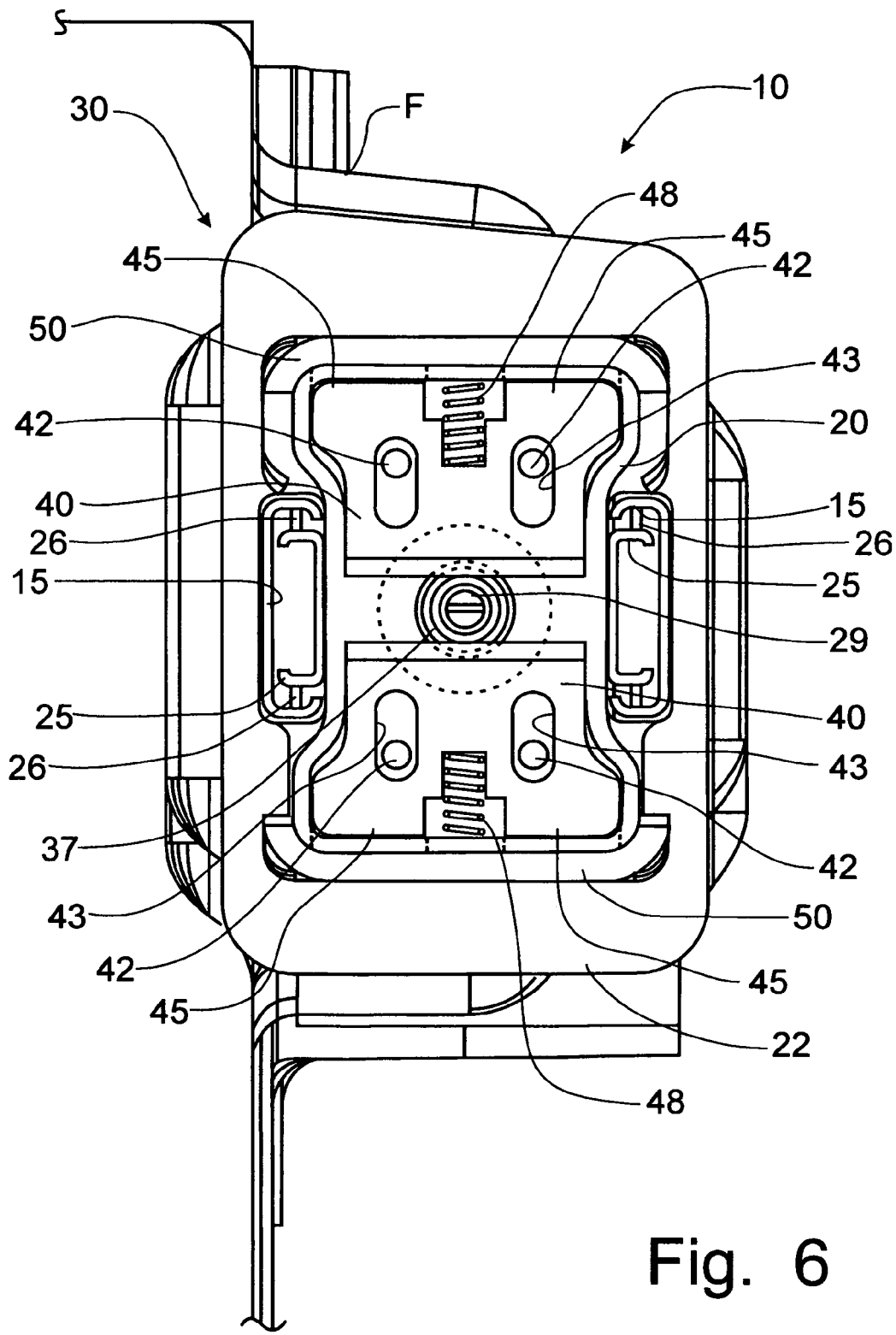
FIG. 6 is an elevational view of the extendible rail mechanism corresponding to the position of the base member as depicted in FIG. 5.

Movement of the movable rail member 20 is powered through an electric motor 27 that is mounted behind the back plate 12 and operatively coupled to the electrical system of the automobile and operatively controlled through a control mechanism described in greater detail below. The motor 27 is connected to a threaded rod 29, as is best seen in FIG. 4, through a worm gear mechanism and extends forwardly from the motor 27 through the back plate 12 into engagement with an actuator mechanism 30. As will be described in greater detail below, the operation of the electric motor 27 drives the rotation of the threaded rod 29 to move the actuation mechanism 30 forwardly or rearwardly, depending on the direction of rotation of the threaded rod 29.

The back plate 12 and the motor 27 are placed in front of a spacer reinforcement bracket S that is part of the design of the lower frame rail F. The motor 27 is mounted generally perpendicularly to the fixed lower frame rail F and the longitudinally extending slide support rails 15 and does not hinder the crush zone of the lower frame rail F. When the movable rail 20 is moved into the extended position, the movable rail is locked into engagement with the lower frame rails F through the actuation mechanism 30, as will be described below, and provides an additional crush zone forwardly of the lower frame rail F to provide the capability of absorbing additional energy from an impact.

The actuation mechanism 30 is best seen in FIGS. 5-8 and is formed with a drive plate 32 that is secured to the rearward portion of the movable rail member 20. A conical drive member 35 is threadably mounted on the threaded rod 29 for translational movement along the rod 29 when the rod 29 is rotated by the electric motor 27. The conical drive member 35 includes a shaft portion 36 that is slidably received through an opening in the drive plate 32 and terminates in a conical cam member 37 positioned forwardly of the drive plate 32. The conical cam member 37 is too large to move rearwardly through the opening in the drive plate 32 and forms an apex at the forwardmost point thereof. A spring 38 is mounted on the shaft portion 36 rearwardly of the drive plate 32 and is retained in position on the shaft portion 36 by a keeper nut 39 affixed to the rearward end of the shaft portion 36. The spring 38 exerts a biasing force on the keeper nut 39 to urge the keeper nut 39 rearwardly and, thus, force the conical cam member 37 against the drive plate 32.

The drive plate 32 has mounted on a forward side thereof a pair of vertically spaced locking members 40 that are retained on the drive plate 32 by respective fasteners 42 positioned within slots 43 formed in the locking members 40 to allow vertical movement of the locking members 40 relative to the drive plate 32. Each locking member 40 is formed with a pair of tabs 45 that correspond to openings formed in the top and bottom surfaces, respectively, of the movable rail member 20. A biasing spring 48, located between the tabs 45 on each respective locking member 40, is trapped between the corresponding top or bottom surface of the movable rail member 20 and each of the locking members 40. The biasing spring 48 urges the locking members 40 inwardly toward engagement with the conical cam member 37.

The front plate 22 has an appropriately shaped opening therethrough for the passage of the movable rail member 20 and the glide members 25. The top and bottom portions of the opening through the front plate 22 have a gap between the front plate 22 and the movable rail member 20, which gap is filled with a wedge member 50 positioned at the top and bottom of the front plate 22. The corresponding surface of the front plate 22 is sloped inwardly toward the rear to mate with the correspondingly sloped surface of the wedge member 50. Thus, when the wedge member 50 is attempted to be moved rearwardly relative to the front plate 22, the mating sloped surfaces of the wedge member 50 and the front plate 22 prevent such movement.

The translational movement of the conical drive member 35 effected by the rotating threaded rod 29 pushes the drive plate 32, and therefore the movable rail member 20, in the direction of movement induced into the conical drive member 35. When the drive member 35 is moving forwardly, the spring 38 keeps the conical cam member 37 against the drive plate 32 and forces the movable rail member 20 forwardly. Similarly, when the conical drive member 35 is moving rearwardly, the cam member 37 pushes against the drive plate 32 to pull the movable rail member 20 rearwardly. The forward movement of the movable rail member 20 is limited by a stop member 26 affixed to the glide member 25 to engage limits on the slide support member 15 and halt the continued forward movement of the glide member 25. When the forward movement of the movable rail member 20 is stopped, the continued rotation of the threaded rod 29 pushes the conical drive member 35 forwardly relative to the drive plate 32, compressing the spring 38 between the keeper nut 39 and the back wall of the drive plate 32, as can be seen in a comparison of FIGS. 5 and 7.

Figure 7:
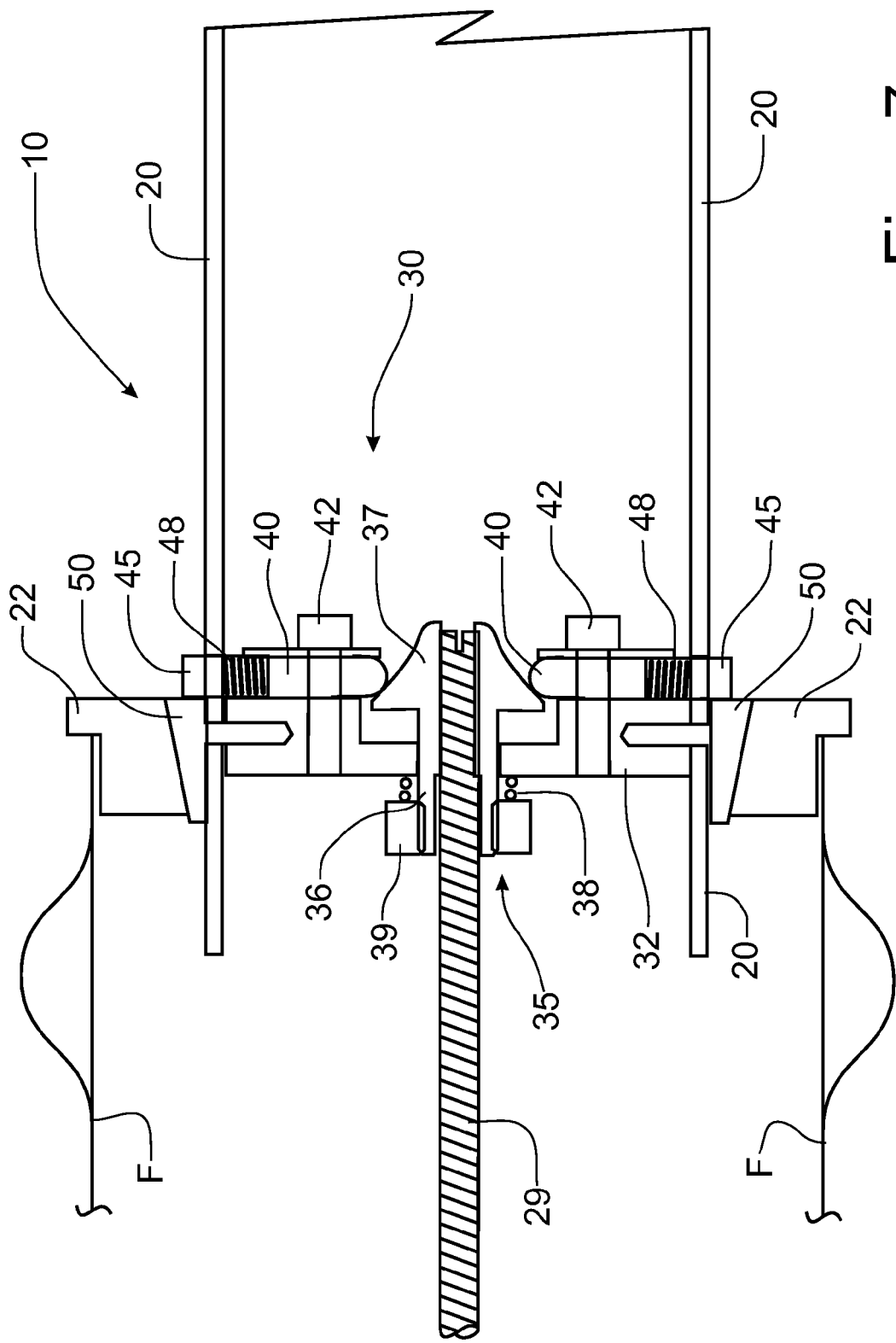
FIG. 7 is a partial cross-sectional view of the extendible rail mechanism showing the base plate of the extendible rail and the front plate taken at the point the extendible rail reaches full extension and after the tabs are driven outwardly by the conical actuator into alignment with the wedge members.
Figure 8:
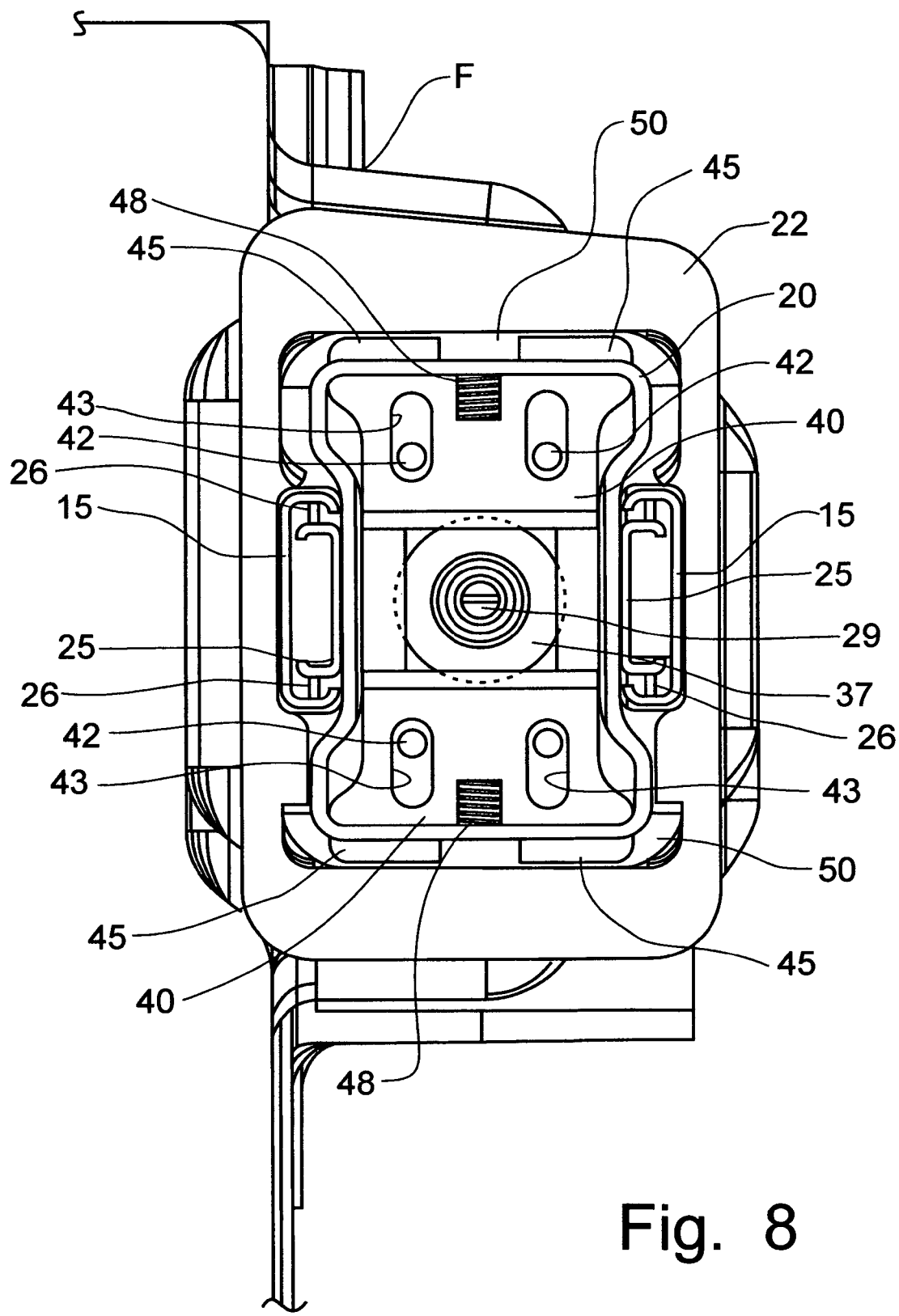
FIG. 8 is an elevational view of the extendible rail mechanism corresponding to the position of the base member as depicted in FIG. 7.

The forward progression of the conical cam member 37 drives the respective locking members 40 outwardly due to the biased engagement of the locking members 40 with the cam member 37, as is depicted in FIG. 7. This outward movement of the locking members 40 extends the tabs 45 through the corresponding slots in the movable rail member 20 and places the tabs 45 in alignment with the wedge members 50. Thus, if the bumper B incurs an impact that pushes the movable rail member 20 rearwardly, the tabs 45 engage the wedge member and lock the extendible rail apparatus 10 in an extended position to provide an additional crush zone and an efficient transfer of the energy imparted into the movable rail member 20 into the fixed lower frame rails F through the wedge members 50 engaged with the front plate 22.

When the movable rail 20 extends forwardly and stops the locking tabs 45 are driven outward by the tapered cam 37 and extend through small slots on the movable rail member 20. This happens when the slots on the movable rail member 20 are moved forwardly to be positioned in front of the front plate 22 and wedge members 50. During an impact, two wedge members 50 (top and bottom) on each front plate 22 are driven between the movable rail member 20 and the front plate 22 to secure the fixed lower frame rail F and the extended rail member 20 when a load is applied to the retractable rail member 20 through the bumper B. This interengagement between the wedge members 50 and the front plate 22 allows the retractable rail member 20 to crush and transfer the load to the rest of the frame structure of the automobile before and during the collapse of the movable rail member 20.

To retract the movable rail member 20, the motor 27 drives the screw rod 29 in the opposite direction, which first pulls the conical cam member 37 rearwardly into the drive plate 32. This movement of the cam member 37 allows the locking members 40 to retract inwardly due to the biasing force imparted by the springs 48 keeping the locking members 40 in engagement with the conical cam member 37. As a result, the tabs 45 are retracted through the slots in the movable rail member 20 to allow the movable rail member 20 to retract into the fixed lower flame rail F. The extended rail member 20 is now free to retract rearwardly inside into the fixed rail F.

The extendible rail apparatus 10 incorporating the principles of the instant invention is much simpler and easy to implement than is known in the art. The extendible rail apparatus 10 does not demand any significant structural changes to the existing current automotive frame design for packaging. Also, the locking members 40 do not require large openings in the extendable rails for implementation. The actuation mechanism 30 provides an effective constraint mechanism since the locking members 40 do not depend on the strength of locking forks that come out through the slots on the moving rails. The operation of the instant invention depends on friction based wedge members 50 that are driven by small tabs 45 through small slots. These tabs 45 do not transfer the impact load but instead drive the wedge members to constraint the already extended movable rail member to the stationary lower rail frames and transfer loads thereto.

The actuation mechanism 30 also does not adversely use up the valuable crush zone already available in the front rail for the mounting and packaging of the drive motor 27 and the actuation mechanism. The extendible rail apparatus 10 also does not have three layers of sheet metal parts in the retracted mode which compromises the capability of the lower frame rails to dissipate impact energy. The drive motor 27 is mounted perpendicular to the axis of the lower frame rail F and can be disengaged during the collapse of the lower frame rail F. The modular extendible rail apparatus 10 incorporating the instant invention provides a pre-assembled module that can be inserted into a slightly modified lower front rail F and does not obstruct the collapse of existing crush zones during a frontal crash. The internal parts of the actuation mechanism 30 can be designed to crush using low cost plastics and mild steel components.

In operation, the retracted movable rail member 20 can be extended when the vehicle reaches a threshold criteria, such as a preset speed of operation. A speed sensor, which is already available in vehicles, signals the control mechanism that the threshold criteria has been reached and the electric motor 27 is activated to cause rotation of the threaded rod 29 operatively connected thereto. As the rod 29 rotates the conical drive member 35 moves along the rod 29 pushing the drive plate 32 and the movable rail 20 to which the drive plate 32 is connected forwardly through the spring 38. When the forward movement of the movable rail member 20 is halted through the stop member 26, the drive member 35 moves forwardly relative to the drive plate 32, compressing the spring 38 and sliding the cam member 37 forwardly to drive the engaged locking members 40 vertically. The cam member 37 causes the locking tabs 45 to project through aligned slots in the movable rail member 20 to become aligned with the wedge members 50 located between the movable rail member 20 and the front plate 22 connected to the fixed lower frame rail F.

Since the extendible rail apparatus 10 activates when the vehicle reaches a threshold speed, no pre-crash sensors are needed. The extended movable rail member 20 increases the front impact crush zone and, thereby mitigates the adverse effects on the occupants of the vehicle, as long as one or both rails are engaged during a collision. The collisions that engage one or both rails include full, offset, and angular in both frontal and rear crashes. The movable rail member can also provide a softer impact on a target vehicle in a side impact collision and, hence, leads to a more compatible vehicle for the real world crashes.

Assuming that no impact has occurred, the lowering of the operating speed of the vehicle again activates the electric motor 27 to rotate the threaded rod 29 in the opposing direction than that use to extend the movable rail member 20. The rearward movement of the cam member allows the springs 48 to retract the locking tabs 45 back through the slots in the movable rail member 20, while the drive member 35 continues to move rearwardly along the threaded rod 29 with the cam member 37 pulling the drive plate 32 and the attached movable rail member 20 rearwardly to the retracted position.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

For example, although the description of the preferred embodiment above relates to a front bumper configuration, the instant invention can be equally applied to rear bumper structures on automotive vehicles, thus providing a front or back or front and back telescopic bumper assemblies 10. Furthermore, the instant invention can be retrofitted to an existing automotive frame structure or incorporated into new automotive frame design.

Having thus described the invention, what is claimed is:

1. An extendible rail assembly for attachment to an automotive bumper, comprising:
   a pair of slide support members supported by a rear plate and a front plate and extending in a longitudinal direction;
   a movable rail member supported on said slide support members for linear movement relative to said slide support members between a retracted position and an extended position;
   a wedge apparatus positioned between said movable rail member and said front plate;
   an actuation mechanism mounted in said movable rail member and including a locking mechanism operable to be positionable in alignment with said wedge apparatus when said movable rail member reaches said extended position; and
   a drive mechanism operably connected to said actuation mechanism to effect linear movement of said movable rail member between said retracted and extended positions.

2. The extendible rail assembly of claim 1 wherein said drive mechanism includes a motor operably connected to a threaded rod to cause rotation thereof.

3. The extendible rail assembly of claim 2 wherein said actuation mechanism includes a drive plate affixed to said movable rail member and a drive member mounted on said threaded rod for translational movement along said rod when said rod is rotated, said drive member being operably connected to said drive plate.

4. The extendible rail assembly of claim 3 wherein said drive member includes:
   a shaft portion received through an opening in said drive plate;
   a conical cam member connected to said shaft portion and being positioned forwardly of said drive plate, said conical cam member being too large to pass through said opening in said drive plate;
   a keeper mounted on said shaft portion rearwardly of said drive plate; and
   a spring mounted on said shaft portion and being trapped between said keeper and said drive plate to assert a biasing force on said drive member to urge said conical cam member against said drive plate.

5. The extendible rail assembly of claim 4 wherein said locking mechanism includes a pair of opposing locking members mounted on said drive plate for vertical movement relative thereto, said locking members being engagable with said conical cam member for effecting vertical movement thereof between an outwardly projecting operative position and an inward inoperative position.

6. The extendible rail assembly of claim 5 wherein said drive member moves forwardly relative to said drive plate when said movable rail member reaches said extended position to compress said spring, said conical cam member driving said locking members vertically into said operative position in response to said drive member moving forwardly relative to said drive plate.

7. The extendible rail assembly of claim 6 wherein said locking members are formed with tabs that are positioned in alignment with said wedge apparatus when placed into said operative position, said tabs projecting through slots formed in said movable rail member.

8. The extendible rail assembly of claim 7 wherein said locking members include a biasing spring urging said locking members toward engagement with said conical cam member.

9. The extendible rail assembly of claim 8 wherein said wedge apparatus includes a pair of wedge members located, respectively, at the top and bottom of said movable rail member, said locking members being positioned on opposing vertical sides of said conical cam member to project said tabs into engagement with said wedge members simultaneously when moved into said operative position.

10. In an automobile having a bumper supported by a lower frame rail, the improvement comprising:
   a pair of slide support members mounted to a front plate connected to said lower frame rail;
   a movable rail member supported on said slide support members for longitudinal movement along said slide support members between a retracted position and an extended position, said movable rail member being connected to said bumper for longitudinal movement thereof;
   a drive mechanism including a motor operably connected to a threaded rod for rotation of said threaded rod; and
   an actuation device mounted in said movable rail member, said actuation device including:

a drive plate connected to said movable rail member;

a drive member mounted on said threaded rod for translational movement along said rod when rotated by said motor, said drive member being engaged with said drive plate to effect selective movement of said movable rail member along said slide support members, said drive member including a conical cam member; and a pair of locking members mounted on said drive plate for vertical movement relative thereto into an operative position when said movable rail member reaches said extended position, said locking members being biased into engagement with said conical cam member for the control of the vertical movement thereof relative to said drive plate.

11. The automobile of claim 10 further comprising wedging apparatus positioned between said front plate and said movable rail member, said front plate and said wedging apparatus having mating sloped surfaces that restrict the rearward movement of said wedging apparatus relative to said front plate, said locking members including tabs that project through slots in said movable rail member when said movable rail member is in said extended position.

12. The automobile of claim 11 wherein said drive member further includes a shaft portion received through an opening in said drive plate, said conical cam member being formed on said shaft portion forwardly of said drive plate, said shaft portion having a keeper mounted thereon rearwardly of said drive plate, said keeper capturing a spring between said keeper and said drive plate to bias said conical cam member rearwardly against said drive plate.

13. The automobile of claim 12 wherein said drive member is movable forwardly relative to said drive plate, compressing said spring between said keeper and said drive plate when said movable rail member reaches said extended position, to drive said locking members vertically.

14. The automobile of claim 13 wherein said wedging apparatus includes a pair of wedge members located, respectively, at the top and bottom of said movable rail member, said locking members being positioned on opposing vertical sides of said conical cam member to project said tabs into engagement with said wedge members simultaneously when moved into said operative position.

15. The automobile of claim 14 further comprising a back plate mounted in said lower frame rail and supporting said slide support members, said motor being positioned behind said back plate with said threaded rod extending through said back plate for engagement with said actuation device.

16. A modular retractable rail apparatus connectable to a bumper on an automobile to cause a positioning of said bumper in response to a predetermined operative criteria of said automobile, comprising:

a pair of slide support members supported by a rear plate and a front plate and extending in a longitudinal direction;

a movable rail member supported on said slide support members for linear movement relative to said slide support members between a retracted position and an extended position;

a wedge apparatus positioned between said movable rail member and said front plate;

an actuation mechanism mounted in said movable rail member and including locking members having tabs that project through slots in said movable rail member when said movable rail member is in said extended position to position said tabs in alignment with said wedge apparatus; and a drive mechanism operably connected to said actuation mechanism to effect linear movement of said movable rail member between said retracted and extended positions.

17. The modular retractable rail apparatus of claim 16 wherein said drive mechanism includes a motor operably connected to a threaded rod for rotation of said threaded rod when said predetermined criteria has been reached.

18. The modular retractable rail apparatus of claim 17 wherein said actuation mechanism includes:

a drive plate connected to said movable rail member;

a drive member mounted on said threaded rod for translational movement along said rod when rotated by said motor, said drive member being engaged with said drive plate to effect selective movement of said movable rail member along said slide support members, said drive member including a conical cam member; and said locking members being mounted on said drive plate for vertical movement relative thereto into an operative position when said movable rail member reaches said extended position, said locking members being biased into engagement with said conical cam member for the control of the vertical movement thereof relative to said drive plate.

19. The modular retractable rail apparatus of claim 18 wherein said drive member further includes a shaft portion received through an opening in said drive plate, said conical cam member being formed on said shaft portion forwardly of said drive plate, said shaft portion having a keeper mounted thereon rearwardly of said drive plate, said keeper capturing a spring between said keeper and said drive plate to bias said conical cam member rearwardly against said drive plate.

20. The modular retractable rail apparatus of claim 19 wherein said drive member is movable forwardly relative to said drive plate, compressing said spring between said keeper and said drive plate when said movable rail member reaches said extended position, to drive said locking members vertically.

* * * * *